March 22, 1960  V. F. MILLER  2,929,913

PORTABLE WELDING TOOL

Filed Sept. 12, 1956  2 Sheets-Sheet 1

INVENTOR
V. F. MILLER
BY John C. Morris
ATTORNEY

March 22, 1960 V. F. MILLER 2,929,913
PORTABLE WELDING TOOL
Filed Sept. 12, 1956 2 Sheets-Sheet 2

INVENTOR
V. F. MILLER
BY
John C. Morris
ATTORNEY

United States Patent Office 2,929,913
Patented Mar. 22, 1960

---

2,929,913

PORTABLE WELDING TOOL

Victor F. Miller, Plandome, N.Y., assignor to Bell Telephone Laboratories, Incorporated, New York, N.Y., a corporation of New York Application September 12, 1956, Serial No. 609,416

11 Claims. (Cl. 219—78)

This invention relates to welding tools and more particularly to portable tools employed to weld replacement contacts on switch assemblies.

The need to replace worn-out or defective contacts on switches, relays, and the like while they are in situ has long presented a formidable problem to the design engineer. Replacing contacts on the more conventional relays used heretofore has not been too difficult since most of them have utilized flat springs. The use of flat springs has contributed to ease of replacement since a flat replacement contact need only be affixed to a flat spring thereby largely eliminating spatial orientation problems.

More recently, however, the increasing use of wire springs in contact spring assemblies has heightened the difficulties of replacement in the field. Particularly with respect to relays of the type disclosed in Patents 2,682,584 and 2,682,585, which patents issued on June 29, 1954, the replacement of fixed contacts is not easily accomplished by prior techniques. In these types of relays, a fixed contact comprises a rectangular metal block having strips of precious metal bonded on two opposite sides. Each block, in turn, is welded to the tip of its cooperating fixed wire spring with its precious metal contact surfaces properly orientated with respect to the rest of the relay structure, and particularly with respect to the surfaces of the movable contacts cooperating therewith. It has been found impractical to remove the old precious metal strips from their metal block and replace them by employing some variation of a convention strip welding tool known to the art, e.g., the welding tool disclosed in Patent 2,342,594.

One reason for this impracticality resides in the fact that the mass of metal in the fixed block requires a large amount of heat in order to reach a bonding temperature and, as a consequence, the molded portions of the fixed wire spring comb may be damaged in the process. This, and other considerations, led to the instant invention which replaces a metal block and the contact strips attached thereto with a U-shaped replacement contact. This technique of replacing contacts obviates the need for stripping the old precious metal away, with the attendant disorientation of fixed spring and metal block.

An object of the present invention, therefore, is to provide a portable welding tool for replacing defective contacts on switches, relays and the like.

Another object of the invention is to replace defective fixed contacts on wire spring relays, as described above, easily and economically without an undue expenditure of time.

According to the invention, these objects are attained by providing means which hold a fixed wire spring (after its defective contact element has been removed), and means which cooperate therewith to hold a replacement contact element, properly orientated adjacent the tip of the wire spring. More specifically, a pair of pivotally mounted jaws act as one electrode and grip the fixed spring so that a holder for the replacement contact element, which acts as the other electrode, may be properly positioned adjacent the tip of the spring.

The need for spatial orientation of a replacement contact in this situation has required a welding tool with special features.

One feature pertains to means associated with the jaws of the tool to define the position along the length of the fixed spring engaged by the jaws. Then too, resilient means are cooperatively associated with the jaws to urge them together. This provides the force necessary to prevent the tool from turning or sliding along the fixed spring after it grips the spring, and also to provide a low resistance current path when weld current is supplied. Disposed adjacent the jaws and in a plane parallel to the longitudinal axis of the fixed spring is a means for holding a replacement contact element. This holding means is slidable in this longitudinal plane to bring a replacement contact element in juxtaposition to the tip of a fixed spring after the spring is gripped properly by the jaws.

The holding means comprises a rectangular bar with one end fashioned to approximate an I-beam cross section lying on one of its sides with the web diameter slightly greater than the bight of the U-shaped replacement contact. This permits the bight of the U to be forced over the web of the I cross section for retention purposes.

After a replacement contact element is so positioned, resilient means are utilized to urge the holding means toward the jaws and the tip of the fixed spring. The resilient means provides the force necessary to slide the holding means until the contact element abuts the tip of the spring and to provide a low resistance current path when weld current is applied.

In the illustrative embodiment of the invention, lower and upper bodies insulatedly separated from each other provide terminal connections for leads to a welding current source. The lower body carries one of the jaws while a lever pivotally mounted thereon cooperatively disposes the other jaw. The upper body is connected through the above-mentioned resilient means and electrical means to the replacement contact holder which is slidable in a longitudinal direction whereby it may abut the cooperating jaws, as noted above. To weld a replacement contact element to the tip of a fixed wire spring, a replacement element is forced over the I-beam cross section on the forward end of the contact holder, the lever is operated to permit the jaws to receive a fixed wire spring, the resilient means intermediate the upper body and contact holder is released to urge the contact holder to abut the replacement contact against the tip of the wire spring, and a welding circuit is then independently completed through the upper body contact holder, replacement contact element, fixed wire spring, and lower body to weld the contact element to the spring.

These and other objects and features of the present invention may be more readily understood when the following detailed description is read with reference to the drawing in which.

Looking more particularly at the drawings, it will be noted that the welding tool comprises a lower body 10 separated from an upper body 11 by a flat rectangular piece of insulating material 12.

Figure 1:
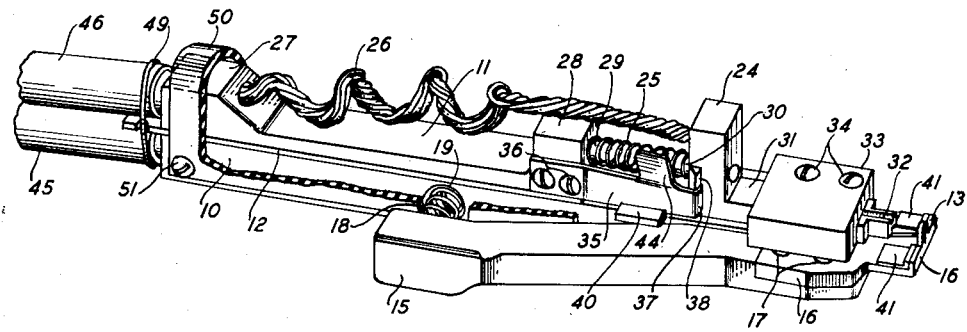
Fig. 1 is a perspective view of the welding tool with its protective cover partially removed.
Figure 2:
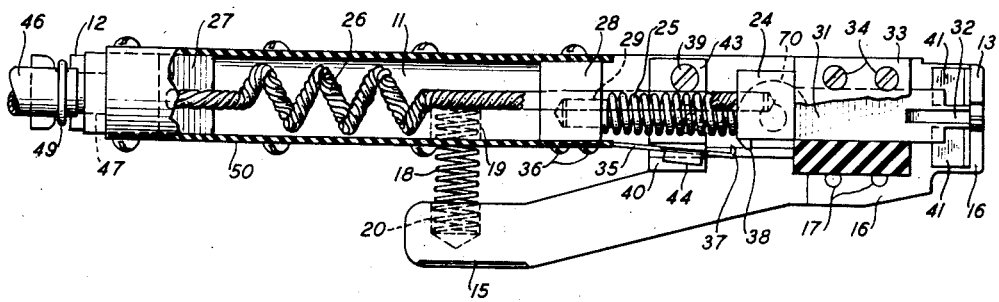
Fig. 2 is a plan view of the welding tool with certain parts partially omitted to more clearly disclose various structural features of the invention.
Figure 4:
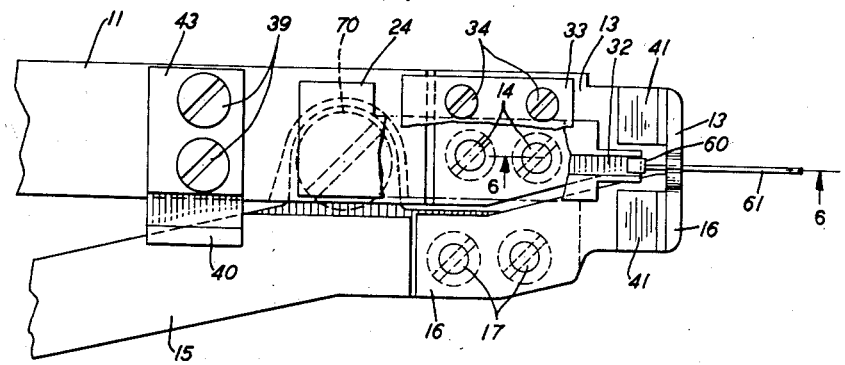
Fig. 4 is a partial plan view of the jaws and contact holder, fragmented to highlight the cooperation between them as electrodes.

The lower body 10 has fixedly attached to its forward end (to the right in Fig. 1) by screws 14 (see Fig. 4) one (13) of two cooperating jaws. Pivotally cooperating with the lower body 10, via screw 70, is a movable lever 15, the forward end of which fixedly supports the other one (16) of the two cooperating jaws (by screws 17). The lever 15 is normally urged away from the body 10 by a spring 18 which has the effect of urging the jaws 13 and 16 together. Apertures 19 and 20 (Fig. 2) are provided in the lower body and lever, respectively, to maintain the coil spring 18 in its proper position.

Figure 3:
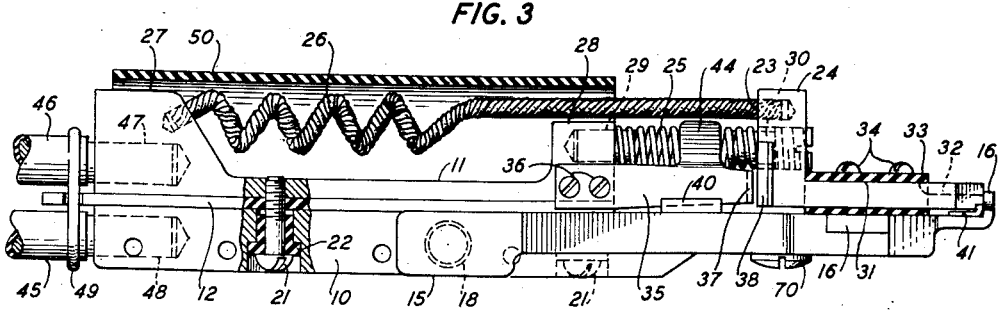
Fig. 3 is a side view of the welding tool with parts partially omitted to illuminate various structural features of the invention.

It will be noted by observing Fig. 3, for example, that the removable jaws 13 and 16 lie in a simple plane except that their forwardmost ends are bent upwardly (towards the top of the drawing—see Fig. 1) at substantially right angles to the longitudinal axis of the lower body. The forwardmost ends of the cooperating jaws 13 and 16 are so constructed that they will tightly grip a fixed spring whenever the lever 15 is temporarily depressed against the restraining spring 18 to allow the fixed spring to be positioned and then released.

The upper body 11 is held above and in line with the lower body 10 by screws 21. Screws 21 threadedly engage the upper body 11 to securely hold the lower body 10, an insulated member 12 and the upper body 11 together. Insulating inserts 22 prevent electrical contact between the bodies.

The upper body 11 is a substantially rectangular member which lies along the longitudinal axis of the lower body 10. The upper body 11 is linked to the holder 24, which acts as a movable electrode, by coil spring 25 and by an electrical pigtail 26. The electrical connection is fixedly attached between the rearward portion 27 of the upper body 11 and the rearward portion or face 23 of the contact holder 24, both of which are apertured therefor. The forward portion 28 of the upper body 11 is apertured to receive a pin 29 which restrains the coil spring 25 in its proper position with respect to the holder 24. The rearward portion 23 of the holder 24 is similarly apertured to receive a pin 30 which restrains the other end of the coil spring 25.

The holder 24 is approximately L-shaped with the longer leg thereof (31) slidably disposed in a longitudinal direction adjacent the lower body 10. On the forwardmost end 32 of the leg 31 is provided means for properly positioning a replacement contact preparatory to affixing it to the tip of a relay spring. The leg 31 of the holder 24 is restricted in its movement by a guide 33. This guide, in turn, is fixedly retained with respect to the lower body 10 by screws 34. The guide 33 is constructed of insulating material and contains the movable electrode holder 24 on four sides thereby guiding it as well as insulating it from the lower body 10 which, it will be remembered, acts as one electrode.

A flat retaining spring 35, held on the forward portion of the upper body 11 by screws 36, extends in a forwardly direction alongside the holder 24. The purpose of the retaining spring 35, which has a transverse bend 37 on its forwardmost end, is to engage a projection 38 on the short leg of the holder 24 thereby to maintain the end 32 of the movable electrode in a rearward position against the compression of the coil spring 25. A piece of insulating material 43 is held at right angles to the longitudinal axis of the lower body 10 by screws 39 and cooperates with the spring 35. The outermost end thereof 40 extends upwardly, above the lower side of the retaining spring 35, to limit movement of the spring 35 in a transverse direction. Thus, the insulated restraining member 43 prevents the spring 35 from unnecessary deflection when the bend therein (37) is moved to disengage the projection 38 on the holder 24 thereby to allow the spring 25 to urge the holder in a forwardly direction. A tab 44 on the spring 35 allows it to be disengaged easily by a user of the tool.

Associated with the replaceable jaws 13 and 16 are L-shaped pieces of insulating material 41. These are mounted directly behind the cooperating jaws and insure the insulation of the jaws, which act as one electrode, from the forwardmost portion 32 of the holder 24, which acts as the other electrode.

Extending rearwardly from lower and upper bodies 10 and 11, respectively, are cables 45 and 46 which may be terminated at an electric current generator. These cables are held on rearward extensions of terminals 47 and 48 by retaining means 49. A cover 50 is provided for affixation to the lower body by screws 51. This cover encloses the upper body 11 from its rearward portion 27 to its forward portion 28 for the purpose of preventing the user of the welding tool from shorting the two electrodes with his hand.

Figure 6:
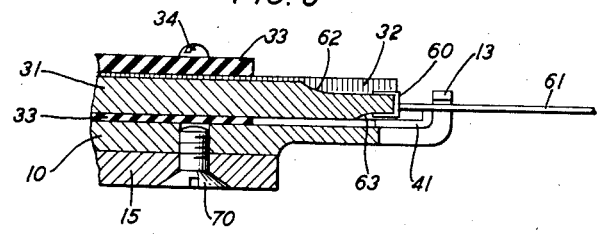
Fig. 6 is a partial cross section along line 6—6 in Fig. 4 to depict the manner in which the holder supports a replacement contact element adjacent a fixed spring.
Figure 5:
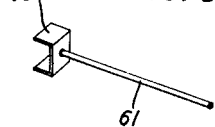
Fig. 5 illustrates a replacement contact element welded to a fixed wire spring.

Looking further at the holder 24, it can be seen, particularly with reference to Figs. 3 and 6, that the forwardmost end 32 is peculiarly shaped, as indicated earlier, to act as a retaining means for a replacement contact element, e.g., contact 60 (Fig. 5). It is fashioned similar to a forwardly extending I-beam with the web portion lying in a longitudinal plane. The web section is tapered from a minimum thickness at the forwardmost end 32 to a greater thickness rearwardly thereof. This result is obtained by arcuately excising material from the upper surface 62 and a lesser amount from lower surface 63. The resulting diameter of the web section is chosen to have a maximum thickness slightly larger than the bight of the U-shaped replacement contact. As a result, a replacement contact, such as 60, may be forced over the end 32 of the movable electrode (holder 24) as shown most clearly in Fig. 6. The difference in the dimensions of end 32 and the replacement contact assures that contact 60 will remain properly positioned until a weld is effected. The legs of the I-cross section assure proper transverse alignment of a replacement contact.

With a replacement contact such as 60 properly positioned on the forward end 32 of the movable holder 24 and the jaws 13 and 16 properly gripping a fixed spring (such as 61) to which the replacement contact is to be affixed, the retaining spring 35 is released to allow the coil spring 25 to urge the holder 24 in a forwardly direction. The limit of forward movement for the holder 24 occurs when the bight of the replacement contact element 60 abuts the tip of the fixed spring 61. With the replacement contact 60 properly positioned with respect to the spring 61, current may be made to flow through the terminals 45 and 46 to weld the contact to the tip of the spring. After the weld is effected, compression of the lever 15 opens the jaws and releases the fixed spring and the relay may be restored to its operating condition.

The strength or resistance to compression of spring 18, interposed between the lower body 10 and the lever 15, is not critical. However, it should be great enough to force the jaws 13 and 16 to firmly grip a fixed spring. In a similar manner, the amount of pressure exerted by the coil spring 25 against the holder 24 is determinative of the pressure existing between a replacement contact element and a fixed spring when a weld is effected. While this pressure, also, is not too critical, it is a fact that the magnitude of the weld current required for a strong weld is dependent, to some extent at least, upon the pressure between the pieces welded. Hence, the variation in resistivity of the coil spring 25 can be employed to change the magnitude of weld current required for a given strength weld.

It is to be understood that the above-described arrangements are only illustrative of the application of the principles of this invention to a specific structure. Numerous other arrangements may be devised by those skilled in the art without departing from the spirit and scope of the invention.

What is claimed is:

1. A welding tool for attaching a piece of channel-shaped contact metal to a spring employed on relays, crossbar switches and the like comprising in combination a first electrode including a pair of pivotally connected jaws, said jaws having bent end portions which when closed cooperate to support the end of said spring; means for opening and closing said jaws; a second electrode including means for holding and orienting said channel-shaped piece of contact metal with respect to said spring, said second electrode lying in a plane normal to said bent end portions and parallel to the pivotally connected jaws; and means for directing said holding and orienting means into juxtaposition with said jaws whereby said piece of channel-shaped contact metal abuts said spring and is properly disposed with respect thereto.

2. A welding tool as defined in claim 1 wherein the second electrode includes a tapered portion for holding said channel-shaped contact piece until firmly affixed to said spring.

3. A welding tool for attaching a piece of contact metal to a spring employed on relays, crossbar switches and the like comprising, in combination, a first electrode including a pair of pivotally connected jaws which, when closed, cooperate to support said spring; means for opening and closing said jaws; a second electrode including a fixed and a movable body electrically connected, said movable body confined to movement in a direction substantially perpendicular to the area of attachment on said spring, means integral with said movable body for properly disposing said contact with respect to said area in directions other than said perpendicular one, said integral means tapered to hold said contact firmly until affixed to said spring; and resilient means for moving said movable body along said confined path to a position adjacent said jaws whereby said contact abuts said area.

4. A welding tool for attaching a piece of contact metal to a spring employed on relays, crossbar switches and the like comprising, in combination, a first electrode including a pair of pivotally connected jaws which, when closed, cooperate to support said spring; means for opening and closing said jaws; a second electrode including a body insulatedly mounted adjacent said first electrode; a contact holder electrically connected to said body, said holder confined by an insulating member fixedly attached to said first electrode and apertured to cooperate with the cross section of said holder whereby said holder is movable in a direction substantially perpendicular to the area of attachment on said spring, means integral with said holder for properly disposing said contact with respect to said area in directions other than said perpendicular one, said integral means tapered to hold said contact firmly until affixed to said spring; resilient means disposed between said body and said holder to urge said holder in juxtaposition to said jaws; restraining means operable to prevent movement of said holder under the influence of said resilient means; and means for releasing said restraining means.

5. A welding tool for attaching a piece of contact metal to the tip of a wire spring employed on relays, crossbar switches and the like comprising, in combination, a first electrode having a longitudinal axis and including a pair of pivotally connected jaws which, when closed, cooperate to support the end of said spring, said jaws having their working surfaces substantially parallel to said axis; means for opening and closing said jaws; a second electrode including a body mounted adjacent said first electrode, a slidable L-shaped rectangularly cross sectioned contact holder electrically connected to said body, said slidable holder transversely confined in a longitudinal sense by an insulating member fixedly attached to said first electrode and longitudinally apertured to cooperate with said rectangular cross section of said slidable holder, and tapered means for holding said contact firmly until affixed to said tip; resilient means disposed longitudinally between said body and said slidable holder to urge said slidable holder in juxtaposition to the tip of said spring; restraining means operable to prevent movement of said slidable holder under the influence of said resilient means; and means for releasing said restraining means.

6. A welding tool for attaching a piece of contact metal to the tip of a wire spring employed on relays, crossbar switches and the like comprising, in combination, a first electrode including a pair of pivotally connected jaws which, when closed, cooperate to support the end of said spring adjacent said tip; means for opening and closing said jaws; a second electrode including a fixed and movable body electrically connected, said movable body confined to movement in a direction substantially along the longitudinal axis of said spring and perpendicular to said tip, means integral with the end of said movable body more closely adjacent said jaws to retain a U-shaped replacement contact element in a properly orientated transverse position, said retaining means comprising an I-shaped cross section having an increasing taper on the web to permit the bight of the U of said contact to be lightly forced over said web until said contact is affixed to said tip; and resilient means for moving said movable body longitudinally to a position adjacent said jaws whereby said contact abuts said tip.

7. A welding tool for attaching a piece of contact metal to the tip of a wire spring employed on relays, crossbar switches and the like comprising, in combination, a first electrode including a pair of pivotally connected jaws which, when closed, cooperate to support the end of said spring adjacent said tip; means for opening and closing said jaws; a second electrode including a body insulatedly mounted adjacent said first electrode and having a longitudinal axis substantially parallel to the working surfaces of said jaws, an L-shaped rectangularly cross sectioned contact holder electrically connected to said body, said holder transversely confined by an insulating member fixedly attached to said first electrode and longitudinally apertured to cooperate with said rectangular cross section of said holder, and means integral with the end of said holder more closely adjacent said jaws to retain a U-shaped contact element in its properly orientated transverse position with respect to said tip, said retaining means comprising an I-shaped cross section with the web thereof disposed transverse to said longitudinal axis and lying in a plane substantially parallel thereto and having an increasing taper to permit the bight of the U of said contact to be lightly forced over said web until said contact is affixed to said tip; resilient means disposed longitudinally between said body and said slidable holder to urge said holder in juxtaposition to said tip; restraining means operable to prevent the movement of said holder under the influence of said resilient means; and means for releasing said restraining means.

8. A welding tool for attaching a piece of contact metal to the tip of a wire spring employed on relays, crossbar switches and the like comprising, in combination, a first electrode including a first body having a longitudinal axis and forward and rearward ends, said first body having a first jaw attached at said forward end, a lever pivotally mounted on said first body and having a second jaw attached to its forward end, which jaw cooperates with said first jaw to firmly grip a wire spring adjacent its said tip when the jaws are closed, first resilient means biasing said lever whereby said cooperating jaws are normally closed; means for opening and closing said lever; a second electrode including a fixed and a movable body electrically connected, said fixed body mounted adjacent the rearward portion of said first body and said movable body transversely confined forward of said fixed body by an insulating member attached to said first body, means integral with the forwardmost end of said movable body to retain said contact in its properly orientated transverse position with respect to said tip when said spring is gripped by said jaws, said integral means tapered to hold said contact firmly until said contact is affixed to said tip; and resilient means disposed longitudinally between said fixed and movable bodies to urge said movable body forward whereby said contact is in juxtaposition to the tip of said spring.

9. A welding tool for attaching a piece of contact metal to the tip of a wire spring employed on relays, crossbar switches and the like comprising, in combination, a first electrode including a first body having a longitudinal axis and forward and rearward ends, said first body having a first jaw attached at said forward end, a lever pivotally mounted on said first body and having a second jaw attached to its forward end, which jaw cooperates with said first jaw to firmly grip a wire spring adjacent said tip when the jaws are closed; first resilient means biasing said lever whereby said cooperating jaws are normally closed; means for opening and closing said lever; a second electrode including a second body insulatedly mounted along and adjacent to the rearward portion of said first body, an L-shaped, rectangularly cross sectioned contact holder electrically connected to said second body, said holder transversely confined forward of said second body by an insulating member fixedly attached to said first body and longitudinally apertured to cooperate with said rectangular cross section of said holder, tapered means for holding said contact firmly until affixed to said tip, second resilient means disposed longitudinally between said second body and said slidable holder to urge said holder forward whereby said replacement contact is in juxtaposition to the tip of said wire spring, restraining means operable to prevent the forward movement of said holder under the influence of said second resilient means, and means for releasing said restraining means; and electrical terminals supported on the rearward portions of said first and second bodies to provide means for completing a welding circuit between said electrodes.

10. A welding tool for attaching a piece of contact metal to the tip of a wire spring employed on relays, crossbar switches and the like comprising, in combination, a first electrode including a lower body having a longitudinal axis and forward and rearward ends, said lower body having a first jaw attached at said forward end, a lever pivotally mounted on said lower body and having a second jaw attached to its forward end, which jaw cooperates with said first jaw to firmly grip a wire spring adjacent said tip when the jaws are closed, first resilient means biasing said lever whereby said cooperating jaws are normally closed; means for opening and closing said lever; a second electrode including a fixed and a movable body electrically connected, said fixed body held adjacent the rearward portion of said lower body and said movable body confined to movement in a longitudinal direction, means integral with the forwardmost end of said movable body to retain a U-shaped contact element in its properly orientated transverse position with respect to said tip of said spring held by said jaws, said retaining means comprising an I-shaped cross section with the web thereof disposed transverse to said longitudinal axis and lying in a plane substantially parallel thereto and having an increasing taper from front to rear thereby to permit the bight of the U of said contact to be lightly forced over said web until the welding operation is completed, and second resilient means disposed longitudinally between said fixed and movable bodies to urge said movable body forward whereby said replacement contact is in juxtaposition to said tip; restraining means operable to prevent the forward movement of said holder under the influence of said second resilient means; means for releasing said restraining means; and electrical terminals supported on the rearward portions of said lower and fixed bodies to provide means for completing a welding circuit between said electrodes.

11. A welding tool for attaching a piece of contact metal to the tip of a wire spring employed on relays, crossbar switches and the like comprising, in combination, a first electrode including a lower body having a longitudinal axis and forward and rearward ends, said lower body having a first jaw attached at said forward end, a lever pivotally mounted on said lower body and having a second jaw attached to its forward end, which jaw cooperates with said first jaw to firmly grip a wire spring adjacent said tip when the jaws are closed, first resilient means biasing said lever whereby said cooperating jaws are normally closed; means for depressing said lever; a second electrode including an upper body insulatedly mounted along and adjacent to the rearward portion of said lower body, an L-shaped, rectangularly cross sectioned contact holder electrically connected to said upper body, said holder transversely confined forward of said upper body by an insulating member fixedly attached to said lower body and longitudinally apertured to cooperate with said rectangular cross section of said holder whereby said holder is movable in a direction substantially parallel to said longitudinal axis, means integral with the forwardmost end of said holder to retain a U-shaped contact element in its properly orientated transverse position with respect to said tip of said wire spring held by said jaws, said retaining means comprising an I-shaped cross section with the web thereof disposed transverse to said longitudinal axis and lying in a plane substantially parallel thereto and having an increasing taper from front to rear thereby to permit the bight of the U of said contact to be lightly forced over said web until the welding operation is completed, and second resilient means disposed longitudinally between said upper body and said slidable holder to urge said holder forward in juxtaposition to said tip; restraining means operable to prevent the forward movement of said holder under the influence of said second resilient means; means for releasing said restraining means; and electrical terminals supported on the rearward portions of said upper and lower bodies to provide means for completing a welding circuit between said eletrodes.

References Cited in the file of this patent

UNITED STATES PATENTS

| | | |
|---|---|---|
| 2,145,274 | Pfanstiehl | Jan. 31, 1939 |
| 2,296,317 | Swenson | Sept. 22, 1942 |
| 2,442,423 | Lomax | June 1, 1948 |
| 2,459,847 | Spencer | Jan. 25, 1949 |
| 2,679,571 | Chappel | May 25, 1954 |
| 2,737,564 | Barnes | Mar. 6, 1956 |
| 2,878,362 | Quinlan | Mar. 17, 1959 |